Patented Apr. 2, 1940

2,196,162

UNITED STATES PATENT OFFICE 2,196,162

POLYMETHINE DYESTUFFS

Werner Müller, Cologne, Ottmar Wahl, Leverkusen, and Ernst Teupel, Schkopau, Germany, assignors to General Aniline & Film Corporation, a corporation of Delaware No Drawing. Application May 10, 1937, Serial No. 141,866. In Germany May 9, 1936

5 Claims. (Cl. 260—240)

(Granted under the provisions of sec. 14, act of March 2, 1927; 357 O. G. 5)

The present invention relates to new polymethine dyestuffs.

The new polymethine dyestuffs are characterized by their containing up to two quinoxaline radicals which are attached in the 2-position to the polymethine chain, and which are substituted in the 3-position by alkyl, aryl or aralkyl and in the 1-position by any radical, as for instance by alkyl, hydroxyalkyl, chloroalkyl, sulfoalkyl, aralkyl, acyl or aryl. This definition also includes cases in which one quinoxaline radical, substituted as mentioned above, is attached in the 2-position to the polymethine chain and linked by means of this polymethine chain with an aromatic radical or a heterocyclic radical, other than quinoxaline, containing auxochromic groups. The above nomenclature is based upon the following scheme:

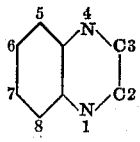

The new dyestuffs are obtained from 2-methylene-quinoxalines of the formula:

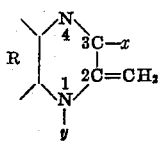

wherein $x$ stands for one of the substituents in the 3-position and $y$ for one of the substituents in the 1-position as mentioned above and R stands for an aromatic radical, such as a benzene or a naphthalene nucleus, which can be substituted for instance by alkyl, alkoxy, halogen, the nitro group, the amino group, the sulfo group and so on, or the salts of these 2-methylene-quinoxalines, and these 2-methylene-quinoxalines or the salts thereof are converted into the polymethine dyestuffs by methods ordinarily used in the manufacture of such dyestuffs. In these methods the formation of polymethine dyestuffs is effected by using for instance formaldehyde, o-formic esters, sodium formate, β-alkoxy-acrolein-acetals, pyridinium salts, formimino-ethers, indoline aldehydes, and the like; (cf. U. S. Patents 1,524,791, 1,878,557, 1,863,679, 1,886,485, and British Patents 334,409, 353,863 and 438,603).

In the formation of the dyestuffs either two molecules of the said 2-methylene-quinoxalines are condensed by connecting them by a shorter or a longer polymethine chain, or one molecule of the said 2-methylene-quinoxaline is connected by means of a polymethine chain with an aromatic or a heterocyclic radical by condensing one molecule of the said 2-methylene-quinoxalines with one molecule of an aldehyde which preferably contains auxochromic groups.

The said 2-methylenequinoxalines can be obtained by causing N-monosubstituted o-diamines to react upon suitable o-diketones; the 1-phenyl-2-methylene-3-methylquinoxaline is, for instance, obtainable according to the following scheme:

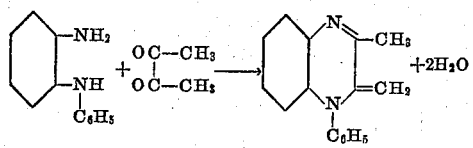

The 2-methylenequinoxalines substituted in the 1-position can partly also be obtained from the easily obtainable corresponding 2.3-dimethylquinoxaline by reaction with alkyl halides, for instance, according to the following equation:

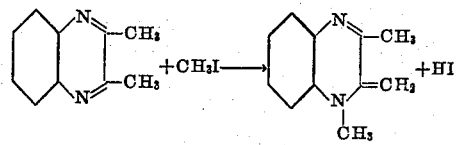

The 2-methylenequinoxalines used as starting material are somewhat unstable. It has, therefore, proved in many cases to be of advantage not to isolate these derivatives, but to carry out one process only in which is contained the reaction leading from the N-monosubstituted o-diamine to the quinoxaline and the immediate condensation of the latter.

The polymethine dyestuffs according to the present invention are generally well crystallizing substances and are distinguished by an excellent clearness, strength of color and a good affinity, and yield on cotton mordanted with tannic acid, silk, artificial silk, cellulose ethers, cellulose esters in general blue to green shades. The dyeings are fast to alkali and acid and are partly of a good dischargeability, especially on acetate silk. Further the new dyestuffs act as strong desensibilizers for the photographic layer.

The invention is illustrated by the following examples, but is not restricted thereto, the parts being by weight:

Example 1

30 parts of N-phenyl-2-methylene-3-methyl-quinoxaline are stirred in 60 parts of acetic acid anhydride with 30 parts of sodium formiate at 30° C. for 24 hours, the deep green solution is mixed with water, freed from minor quantities of resin and then precipitated with sodium chloride. The dyestuff which corresponds to the following formula:

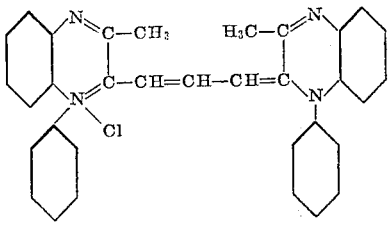

is obtained in fine needles of golden luster. It represents the symmetric polymethine dyestuff prepared from 2 molecular proportions of the mentioned quinoxaline connected by a chain consisting of three CH-radicles, and dyes cotton and silk clear greenish shades.

Example 2

One molecular proportion of N-phenyl-2-methylene-3-methylquinoxaline is condensed in acetic acid anhydride with one molecular proportion of 1.3.3-trimethylindoline-2-methylene-ω-aldehyde at 30° C. during 6 hours. An asymmetric polymethine dyestuff is thus obtained. The solution is poured into water, freed from the resin and precipitated with sodium chloride. The dyestuff is obtained in fine needles; the salt is water-soluble. The dyestuff, which corresponds to the following formula:

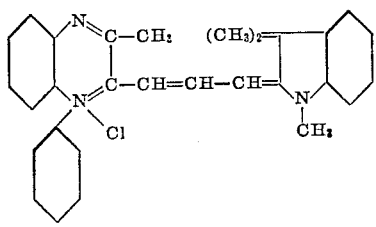

dyes cotton, silk and acetate artificial silk clear, pure blue shades. It is fast to acid and alkali and dischargeable on acetate artificial silk. The discharges are fast to light.

Example 3

One molecular proportion of the quinoxaline derivative mentioned in Example 1 is condensed in acetic acid anhydride with one molecular proportion of 4-diethyl-amino-benzaldehyde during 24 hours at 30° C. and worked up in the same manner as stated in the preceding examples. A bluish-green dyestuff is obtained, which corresponds to the following formula:

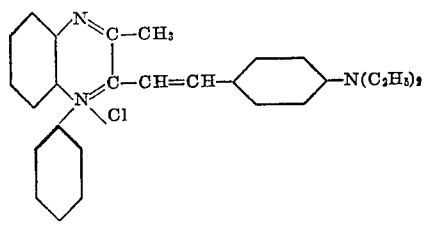

Example 4

One molecular proportion of N-methyl-2-methylene-3-methylquinoxaline is condensed with one molecular proportion of the aldehyde described in Example 2. A dyestuff is obtained of a very high dyeing strength; it dyes a reddish blue. The dyestuff corresponds to the following formula:

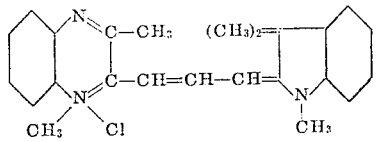

Example 5

30 parts of N-methyl-2-methylene-3-methyl-quinoxaline are stirred in 60 parts of acetic acid anhydride at 30° C. for 24 hours with 30 parts of sodium formiate. A green dyestuff, the symmetric polymethine dyestuff, is obtained which corresponds to the following formula:

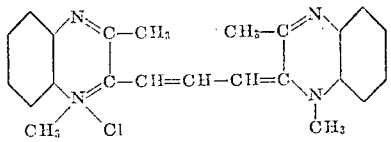

and which dyes clear green shades.

Example 6

One molecular proportion of N-sulfoethyl-2-methylene-3-methylquinoxaline is condensed with one molecular proportion of the aldehyde mentioned in Example 2 in the same manner as described in this example. The dyestuff obtained which corresponds to the following formula:

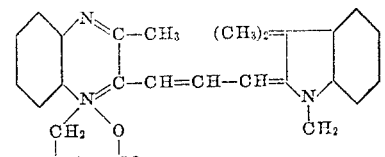

dyes almost the same shade as that obtained according to Example 2, but it is insoluble in water and easily soluble in organic solvents.

Example 7

One molecular proportion of N-benzyl-2-methylene-3-methylquinoxaline is condensed with one molecular proportion of the aldehyde mentioned in Example 2 in the manner described there. A difficultly soluble dyestuff is obtained which corresponds to the following formula:

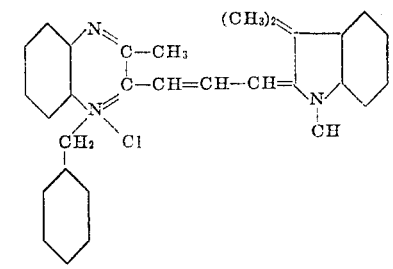

and which dyes a clear blue.

Example 8

One molecular proportion of N-phenyl-2-methylene-3-methyl-6-chloroquinoxaline is condensed with one molecular proportion of the aldehyde mentioned in Example 2 in the manner described there. A greenish well crystallizing dyestuff is obtained dyeing a very clear greenish-blue. The dyestuff corresponds to the following formula:

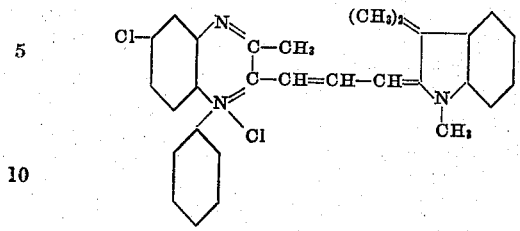

Example 9

One molecular proportion of N-(p-ethoxyphenyl)-2-methylene-3-methyl-6-aminoquinoxaline is condensed with one molecular proportion of the aldehyde mentioned in Example 2 in the manner described there; at the same time acetylation of the 6-amino group takes place and a well crystallizing dyestuff is obtained which dyes a clear deep blue, and which corresponds to the following formula:

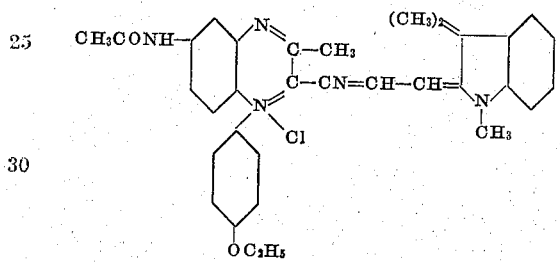

Example 10

One molecular proportion of o-aminodiphenylamine is added to a solution of one molecular proportion of diacetyl in acetic acid anhydride with cooling; after dissolution and formation of the quinoxaline—which process only lasts a few minutes—one molecular proportion of 1.3.3-trimethyl-indoline-2-methylene-ω-aldehyde is added, the mixture is stirred at 30–40° C. for 6 hours. The dyestuff obtained is identical with the dyestuff obtained according to Example 2.

Example 11

One molecular proportion of 2.3-dimethylquinoxaline is caused to react upon one molecular proportion of methyl iodide at 60° C. The 1.2.3-trimethylquinoxalinium iodide thus obtained is finely powdered and added to a solution of one molecular proportion of 1.3.3-trimethylindoline-2-methylene-ω-aldehyde. The formation of the dyestuff takes already place in the cold and is complete after 6 hours at 35° C. The dyestuff corresponds to the following formula:

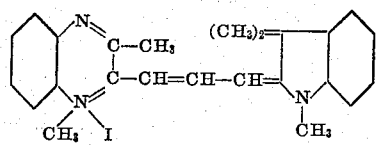

We claim:
1. Polymethine dyestuffs of the general formula: R—CH=CH—CH=R₁ wherein R stands for a quinoxaline radical and R₁ for one of the radicals of the group consisting of quinoxaline radicals and 1.3.3-trialklyindoline radicals, these radicals being attached in the 2-position to the trimethine chain, and the quinoxaline radicals either the 1-N of the quinoxaline or of the indoline being quaternary are substituted in the 3-position by an alkyl radical and in the 1-position by a member of the group consisting of alkyl, sulfoalkyl, benzyl and mononuclear aromatic radicals.

2. Polymethine dyestuffs as claimed in claim 1 in which the quinoxaline radicals are substituted in the 3-position by a methyl radical.

3. Polymethine dyestuffs as claimed in claim 1 in which the quinoxaline radicals are substituted in the 3-position by a methyl radical and in the 1-position by a phenyl radical.

4. The polymethine dyestuff of the formula:

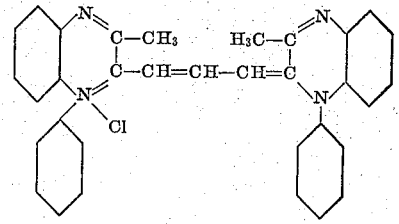

5. The polymethine dyestuff of the formula:

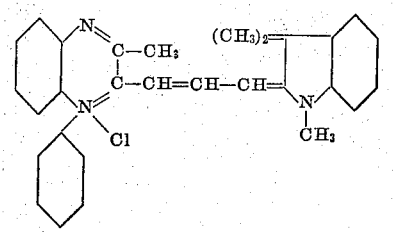

WERNER MÜLLER.
OTTMAR WAHL.
ERNST TEUPEL.

CERTIFICATE OF CORRECTION.

Patent No. 2,196,162.  April 2, 1940.

WERNER MÜLLER, ET AL.

It is hereby certified that error appears in the printed specification of the above numbered patent requiring correction as follows: Page 3, first column, lines 24 to 34 inclusive, in the formula, for "-CN=CH-CH=" read -- -CH=CH-CH= --; page 3, second column, line 15, claim 1, for "1.3.3-trialklyindoline" read --1.3.3-trialkylindoline--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.